United States Patent [19]

Iwabuchi et al.

[11] 4,330,806
[45] May 18, 1982

[54] TRANSDUCER FEEDING MECHANISM IN AN APPARATUS FOR RECORDING AND REPRODUCING A SIGNAL ON AND FROM A ROTARY RECORDING MEDIUM

[75] Inventors: Yoshitaka Iwabuchi, Yamato; Masao Nozaki, Kawasaki, both of Japan

[73] Assignee: Victor Company of Japan, Ltd., Yokohama, Japan

[21] Appl. No.: 137,508

[22] Filed: Apr. 4, 1980

[30] Foreign Application Priority Data

Apr. 5, 1979 [JP] Japan .................................. 54-40316

[51] Int. Cl.³ ...................... G11B 5/012; G11B 5/55; G11B 21/08
[52] U.S. Cl. ................................ 360/106; 360/97; 360/78
[58] Field of Search ................. 360/105, 106, 107, 97, 360/99, 78, 104, 98

[56] References Cited

U.S. PATENT DOCUMENTS

| | | | |
|---|---|---|---|
| 3,749,827 | 7/1973 | Kinjo | 360/106 |
| 3,913,137 | 10/1975 | Morgan | 360/106 |
| 4,005,493 | 1/1977 | Morgan | 360/97 |
| 4,139,877 | 2/1979 | Townsend | 360/106 |
| 4,143,409 | 3/1979 | Iwabuchi | 360/106 |
| 4,180,832 | 12/1979 | Bixby | 360/106 |

*Primary Examiner*—Robert M. Kilgore
*Attorney, Agent, or Firm*—Michael N. Meller; Anthony H. Handal

[57] ABSTRACT

A transducer feeding mechanism is used for an apparatus for recording and reproducing a signal on and from a rotary recording medium by means of a transducer fed over the recording medium in the radial direction thereof. The mechanism comprises a rotational motive power source having a rotary shaft and a pinion provided on the shaft, a rack meshed with said pinion and fed in translational movement by the rotation of the pinion, a single guide bar extending in the direction of feeding of the transducer, a first feeding carriage on which the rack is mounted, and which is guided by said guide bar, a second feeding carriage on which the transducer is mounted, and which is guided by said guide bar, a contact bar extending in substantially parallel with the guide bar, a contact member mounted on the second feeding carriage and contacting said contact bar, and biasing means provided between the first and second feeding carriages and functioning to impart torques to the first feeding carriage in a direction to cause the rack to mesh further with the pinion and to the second feeding carriage in a direction to cause the contact member to contact the contact bar.

6 Claims, 6 Drawing Figures

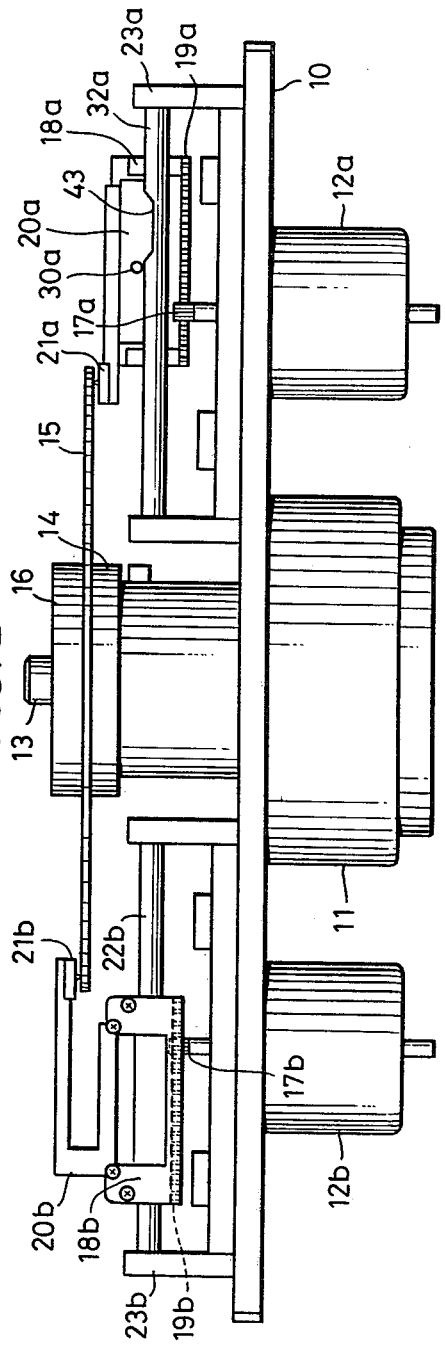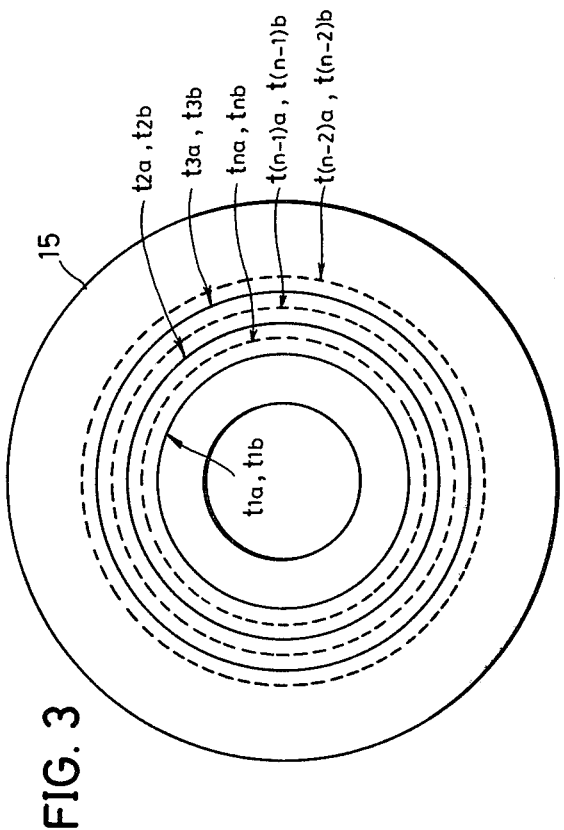

TRANSDUCER FEEDING MECHANISM IN AN APPARATUS FOR RECORDING AND REPRODUCING A SIGNAL ON AND FROM A ROTARY RECORDING MEDIUM

BACKGROUND OF THE INVENTION

The present invention relates generally to transducer moving or feeding mechanisms in apparatuses for recording and reproducing of signals on and from rotary recording mediums. More particularly the invention relates to a mechanism for feeding in traverse movement a transducer for carrying out recording and reproducing signals on and from a rotary recording medium, the mechanism being capable of thus feeding the transducer in a highly accurate and positive driving power transmission state and, moreover, without shock or vibration.

In the prior art, an apparatus wherein a plurality of magnetic heads are intermittently advanced alternately over a rotating magnetic medium, such as a magnetic disc or a magnetic sheet, in the radial direction thereof, and a television signal is alternately recorded on and reproduced from concentric tracks on the medium at a rate of one field in one track has been known. Recording and reproducing apparatuses of this character are disclosed in the specifications of references such as, for example, U.S. Pat. Nos. 3,649,752, 3,681,525, and 3,749,827.

Heretofore, apparatuses for recording and reproducing magnetic discs of the type wherein a magnetic head is caused to move intermittently over a rotary magnetic disc thereby to record and reproduce video signals with concentric tracks have been reduced to practice. As a device for moving the head in an apparatus of this type for recording and reproducing magnetic discs, a device is proposed as disclosed in the specification of U.S. Pat. No. 3,749,827, in which an endless belt passed around a driving shaft driven by a stepping motor (pulse motor) and a driven shaft are moved intermittently, and a magnetic head mounted on the endless belt is caused to move in traverse movement over the magnetic disc.

This device, however, has been accompanied by difficulties such as permanent elongation in the endless belt as result of a long period of use and the occurrence of uneven elongation in the belt when the driving shaft and the driven shaft are not precisely parallel, whereby the magnetic head cannot be moved over the magnetic disc accurately and positively over specific tracks. A further problem accompanying this device is that the magnetic head cannot be moved with accurate pitch because of occurrences such as slippage between the belt and the shafts, variation in the difference between the tensions in the belt on the driving shaft side and on the driven shaft side, and stretching and shrinking of the belt due to variations in temperature.

Accordingly, in order to solve the above described problems, we have devised a moving mechanism so constituted that, instead of the head moving mechanism described above wherein a head and shafts are used, a rack is fixed to a moving base or carriage on which a magnetic head is fixedly mounted, and a pinion provided on the rotor shaft of a motor is adapted to mesh with this rack, whereby rotation of the pinion by the motor causes the rack, and therefore the head, to move. In a device of this mechanical arrangement, however, there are a number of problems such as low accuracy of movement position of the head due to backlash between the rack and the pinion and transmission to the head of shocks between the rack and the rotating pinion, whereby satisfactory head movement cannot be attained. These problems become particularly serious in the case of an apparatus for recording and reproducing magnetic discs of a system wherein the motor rotates intermittently, and the head is moved intermittently.

Accordingly, in order to solve these problems, we have developed and reduced to practice a transducer feeding mechanism in an apparatus for recording and reproducing a signal on and from a rotary recording medium as described in the specification of U.S. Pat. No. 4,143,409. This previously developed transducer feeding mechanism comprises a rotational motive power source having a rotary shaft and a pinion provided on the shaft, a rack meshed with said pinion and fed in translational movement by the rotation of the pinion, two guide bars extending parallelly in the direction of feeding of the transducer, a first feeding carriage on which the rack is mounted and which is guided by the first guide bar, biasing means provided on the first feeding carriage and functioning to contact the second guide bar in an elastic manner and to urge the first feeding carriage in a direction to cause the rack to mesh further with the pinion, a second feeding carriage on which the transducer is mounted, and which is guided by the second guide bar, a guide member mounted on the second feeding carriage and contacting in a rotationally displaceable manner the first guide bar, and engagement means functioning to place the first and second feeding carriages in contacting engagement in the feeding direction along the first and second guide bars and in a mutually displaceable state within a plane perpendicular to the feeding direction.

In this previously developed transducer feeding mechanism, the rack meshes with the pinion with substantially no backlash, whereby the head is accurately fed in intermittent movement. Further, transmission of unwanted shock in directions other than the moving direction from the first carriage to the second carriage is prevented, whereby the head can be fed accurately and positively.

However, as described above, this previously developed transducer feeding mechanism is so constituted that first and second feeding carriages are caused to move as they are guided by first and second guide bars. Consequently, unless the first and second guide bars are set parallelly in all of the three-dimensional directions of space, the relative positional relation between the first and second feeding carriage will change as the feeding proceeds. Accordingly, in the assembly of the feeding mechanism, the first and second guide bars must be so adjusted and set that they will be parallel with respect to all directions. This assembly and adjustment is troublesome, which has been a problem. Another problem has been the high cost due to the necessity of using two guide bars which are required to conform to strict specifications of linearity, surface finish precision, and other characteristics.

SUMMARY OF THE INVENTION

Accordingly, it is a general object of the present invention to provide a novel and useful transducer feeding mechanism in an apparatus for recording and reproducing a rotary recording medium in which mechanism the above described problems have been solved.

Another and specific object of the invention is to provide a transducer feeding mechanism in an apparatus for recording and reproducing a rotary recording medium in which mechanism a first carriage provided with a rack driven by a pinion driven in turn by a motor and a second carriage provided with a transducer being guided by a single guide bar. In the transducer feeding mechanism of the above stated character, the bias imparting means is provided between the first and second carriages so that the rack meshes with the pinion with substantially no backlash. The transducer feeding mechanism further has a contact member provided on the second feeding carriage and a contact bar to be contacted by the contact member. In the mechanism of this invention, the assembly work and adjustments are simple since strict parallelism between the single guide bar and the contact bar is not required. Furthermore, since two feeding carriages are guided by the single guide bar, only a single guide bar, which is required to have a high finish precision, is sufficient, and the contact bar is not required to be fabricated with high precision. For these reasons, the production cost of the mechanism is low.

Other objects and further features of the invention will be apparent from the following detailed description with respect to a preferred embodiment of the invention when read in conjunction with the accompanying drawings.

BRIEF DESCRIPTION OF THE DRAWINGS

In the drawings:

FIGS. 1 and 2 are respectively a plan view and an elevational view of one example of an apparatus for recording and reproducing on and from a rotary recording medium provided with a transducer feeding mechanism according to the invention;

FIG. 3 is a plan view showing one example of a track pattern of a rotary magnetic disc;

DETAILED DESCRIPTION

Figure 1:
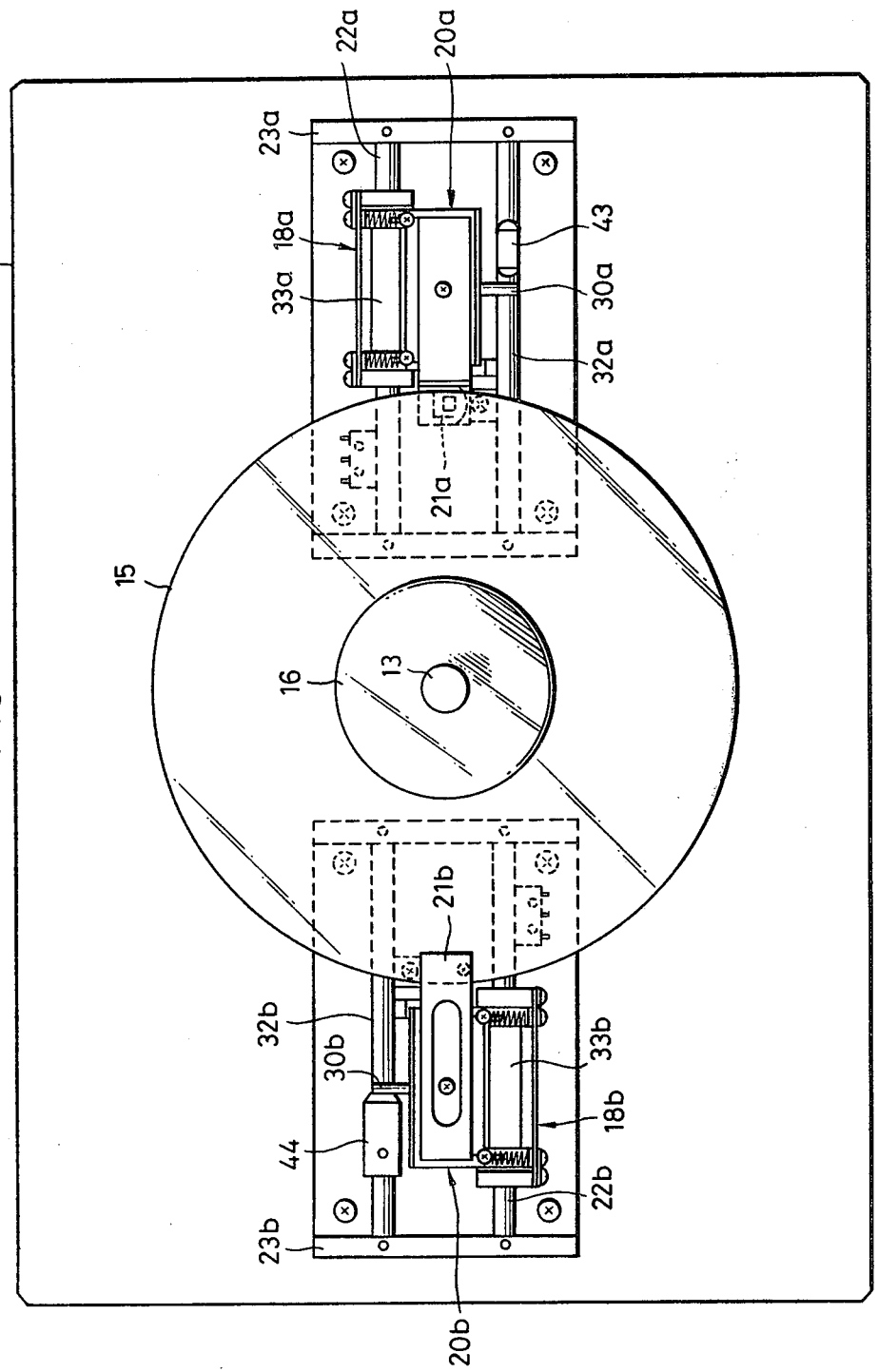

Referring first to FIGS. 1 and 2, a disc motor 11 and pulse motors 12a and 12b are mounted on the lower surface of a base plate 10. A rotary magnetic medium of disc shape (hereinafter referred to as a disc) 15 is placed on a flange 14 fixed coaxially to the rotor shaft 13 of the disc motor 11 and is fixedly held by a clamper 16 with an accuracy expressed as less than a number of tens of $\mu$m of surface oscillation. The disc 15 has upper and lower surfaces ground to mirror surfaces, on which respective layers of magnetic material have been formed.

On a rack feeding carriage 18a is mounted a rack 19a which is of a length corresponding to at least the feeding stroke of a magnetic head 21a relative to the magnetic disc 15, and which has rack teeth. This rack 19a is meshed with the upper part of a pinion 17a provided on the rotor shaft of the pulse motor 12a. The rack 19a and the pinion 17a are both formed with small teeth and thereby have relatively large numbers of teeth.

A head feeding carriage 20a supports the magnetic head 21a. The feeding carriages 18a and 20a are guided and fed by a single guide bar 22a supported horizontally and mutually parallelly by a frame 23a above the base plate 10. The feeding carriages 18a and 20a are intermittently driven in feeding movement by the intermittent rotation of the pulse motor 12a transmitted through the pinion 17a and the rack 19a. The magnetic head 21a is fed along the radial direction of the disc 15. During each period in which it is stopped, the magnetic head 21a carries out recording or reproducing along one of the concentric tracks on the lower surface of the disc 15.

In FIGS. 1 and 2, the pulse motor 12b, carriages 18b and 20b, and mechanism parts related thereto which are shown on the left-hand side are similar to the above described pulse motor 12a, carriages 18a and 20a, and related mechanism parts shown on the right-hand side. Accordingly, like parts respectively on the left-hand and right-hand sides are designated by like reference numerals but respectively with subscripts a and b, and detailed description of the mechanism on the left-hand side will be omitted. However, the left-hand mechanism differs from the right-hand mechanism in that a magnetic head 21b carries out recording and reproducing on and from the upper surface of the disc 15. The pulse motors 12a and 12b alternately undergo intermittent rotation.

As illustrated in FIG. 3, each of the magnetic heads 21a and 21b comprises an erasing head chip and a recording and reproducing head chip and two dummy cores provided on a leaf spring. When the rotation of the disc 15 is stopped, the working ends of the head chips and the dummy cores abuttingly contact the disc surface, but when the disc 15 is rotating, they are in a state of floatation of 0.1 to 0.2 $\mu$m from the surface of the disc 15 due to an air film formed as a result of the rotation of the disc.

In the normal recording operation, first, the magnetic head 21a is stopped, for example, and the recording and reproducing head chip records a television signal through one field, as the preceding erasing head chip erases a previously recorded signal, along the innermost track t1a on the lower surface of the disc 15 shown in FIG. 3 during one revolution of the disc 15. Upon completion of this recording, the pulse motor 12a is supplied with driving pulses and rotates intermittently, and the magnetic head 21a moves to the succeeding track t2a and stops. While this magnetic head 21a is thus moving, the magnetic head 21b is stopped and records the television signal through the succeeding one field along the innermost track t1b on the upper surface of the disc 15 during the succeeding one revolution thereof. Similarly thereafter, while the magnetic head 21b shifts intermittently to the succeeding track t2b, the magnetic head 21a records the television signal of the succeeding one field along the track t2a. In this alternating manner, recording is carried out successively along tracks t2b, t3a, t3b, . . . and so on.

When the magnetic heads 21a and 21b have recorded successively from the innermost to the outermost tracks of the disc 15 their advance directions are reversed. The amounts of advance of the magnetic heads at the time of reversal are staggered by $\frac{1}{2}$. Accordingly, when the magnetic heads 21a and 21b carry out recording in return paths from the outer periphery to the innermost tracks of the disc 15, this recording is carried out along tracks represented by tracks . . . t(n−2)a, t(n−2)b, tracks t(n−1)a, t(n−1)b, and tracks tna, tnb indicated by broken lines and interposed between the tracks indicated by solid lines of the above described outgoing path from the innermost track to the outer periphery of the disc 15. Subsequently, recording of one or more new signals can be carried out again from the innermost tracks to the outer periphery of the disc 15 in an endless manner to a desired time instant by means of the magnetic heads 21a and 21b as the previously recorded signal is erased.

One embodiment of the transducer feeding mechanism according to the present invention will now be described in conjunction with FIGS. 4, 5A, and 5B. Here, only the feeding mechanism disposed on the right-hand side of the disc motor 11 as viewed in FIGS. 1 and 2 and comprising constituent elements designated by reference numerals with the subscript a will be described. Since the feeding mechanism on the left-hand side comprising parts designated by reference numerals with the subscript b is of the same construction, it will not be described.

The rack feeding carriage 18a comprises a pair of boss parts 24a and 25a and a holding plate 26a of an angle-shape or L-shaped cross section for holding these boss parts in spaced-apart positions with a specific spacing therebetween. The rack 19a is fixed to the lower surfaces of these boss parts 24a and 25a.

The head feeding carriage 20a comprises a support structure 29a having integrally therewith a pair of boss parts 27a and 28a and a pin 30a embeddedly fixed to a side surface thereof. The magnetic head 21a is supported on a base plate 31a mounted on the head supporting structure 29a. The pin 30a is in contact with the upper surface of a contact bar 32a supported parallelly to the guide bar 22a by the frame 23a. There is no necessity for the contact bar 32a to be parallel to the guide bar 22a with respect to all directions, the only requirement being that it be parallel to the guide bar in only the height direction.

Through the boss parts 27a and 28a of the head feeding carriage 20a, a hollow cylindrical member 33a, in which the guide bar 22a is slidably fitted, is inserted and thus fixed to the boss parts 27a and 28a. The two end parts of this cylindrical member 33a extend to the interiors of the boss parts 24a and 25a of the rack feeding carriage 18a. The boss parts 24a and 25a are mounted by way of ball bearings 34a and 35a on the two ends of the cylindrical member 33a. Thus, the rack feeding carriage 18a and the head feeding carriage 20a are unitarily slidable on the guide bar 22a in its longitudinal direction with the cylindrical member 33a and the ball bearings 34a and 35a interposed therebetween and, at the same time, are rotatable in a mutually independent manner about the guide bar 22a.

Spring retainers 36a and 37a are fixed by screws to the upper parts on opposite sides of the holding plate 26a of the rack feeding carriage 18a. Lugs 38a and 39a are fixed by screws to the head feeding carriage 20a. Between the spring retainers 36a and 37a and the head supporting structure 29a, coil springs 40a and 41a, respectively, are disposed in compressed state and in a state where the lugs 38a and 39a are respectively inserted therein. The spring force of these coil springs 40a and 41a in compressed state imparts, about the guide bar 22a, a torque in the arrow direction A to the rack feeding carriage 18a and a torque in the arrow direction B to the head feeding carriage 20a. However, as long as the pin 30a is in contact with the contact bar 32a, the head feeding carriage 20a cannot rotate about the guide bar 22a. Consequently, the rack feeding carriage 18a is relatively subjected to a torque in the arrow direction A. As a result, the rack 19a is meshed with the pinion 17a as a force continually presses the rack toward the pinion. For this reason, the rack 19a is intermittently fed without backlash in accordance with the intermittent rotation of the pinion 17a.

A spring washer 42a of wave form is disposed between the boss part 24a of the rack feeding carriage 18a and the boss part 27a of the head feeding carriage 20a. As a consequence of the rack 19a being driven in intermittent feeding motion by the pinion 17a, the rack feeding carriage 18a and the head feeding carriage 20a are unitarily and intermittently fed in the longitudinal direction of the guide bar 22a.

A concavity 43 is formed at a predetermined position on the upper part of the contact bar 32a. When the head feeding carriage 20a is fed further to the right-hand side as viewed in FIG. 4 from the position indicated therein, the pin 30a drops into this concavity 43 since the pin 30a is continually urged in the direction for contacting the contact bar 32a by the springs 40a and 41a. The head feeding carriage 20a thereby rotates in the arrow direction B about the guide bar 22a. As a consequence, the magnetic head 21a separates from the lower surface of the disc 15. Therefore, at the time of changing of the disc 15, at the time of transportation of the recording and reproducing apparatus, or on a like occasion, the rack feeding carriage 18a and the head feeding carriage 20a are moved to the above mentioned position and caused to separate from the magnetic head 21a, whereby damage or breakage due to impact-like contacting mutually between the magnetic head 21a and the disc 15 can be prevented.

Figure 4:
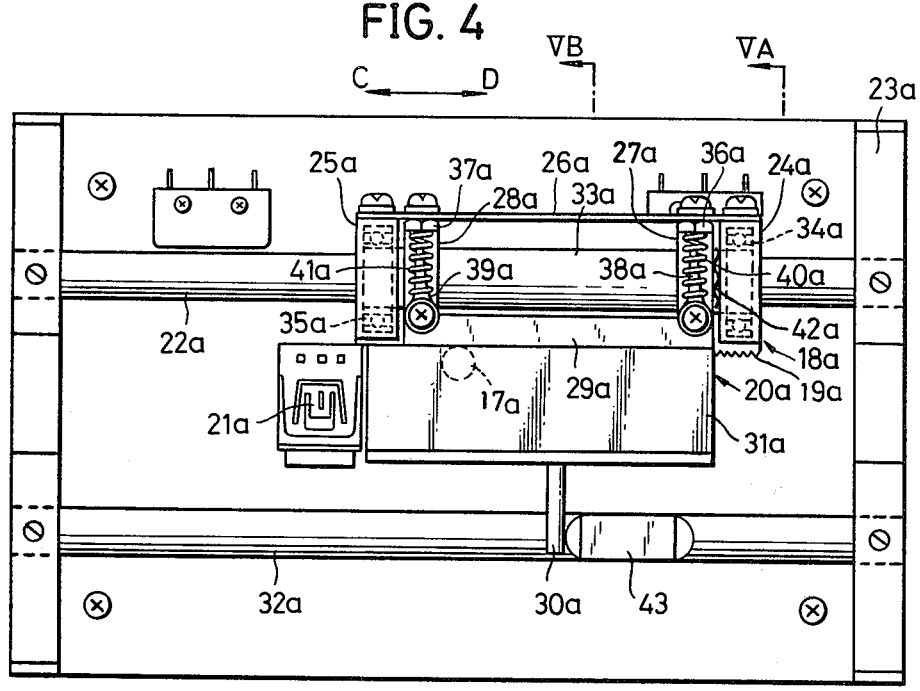
FIG. 4 is a plan view of one embodiment of transducer feeding mechanism according to the invention.
Figure 5A:
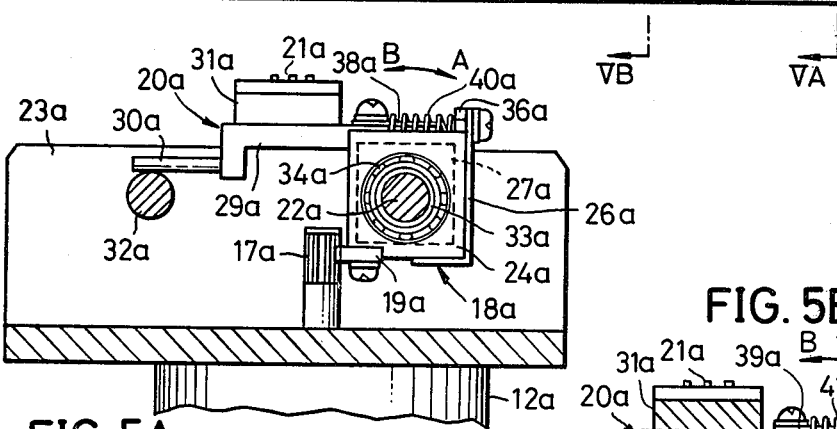
FIGS. 5A and 5B are respectively side sectional views of the same mechanism taken along VA—VA and VB—VB lines in FIG. 4.
Figure 5B:
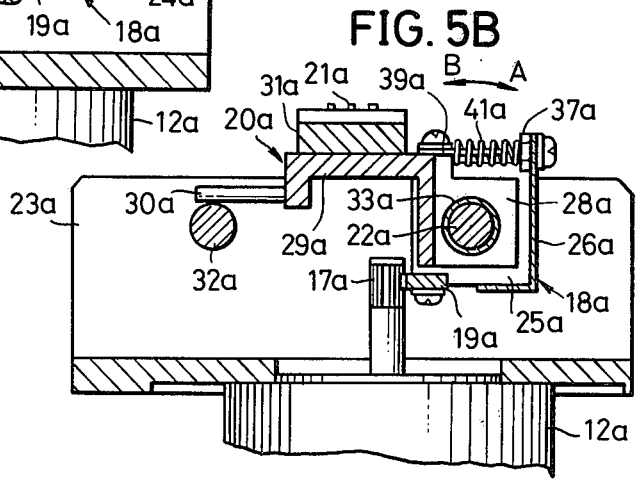

Here, as described above, although the feeding carriages 18a and 18b are free to rotate as independent structures in the arrow directions A and B in FIGS. 5A and 5B, they move unitarily in the arrow directions C and D in FIG. 4. Moreover, the rack 19a is urged toward the direction for meshing with the pinion 17a, whereby the rack 19a and the pinion 17a are in a state wherein there is no backlash therebetween. Therefore, in the recording or reproducing of a video signal, the rack 19a is fed intermittently without backlash as the pulse motor 12a rotates intermittently, and the feeding carriages 18a and 20a are unitarily fed intermittently in the direction C or D.

For this reason, the magnetic head assembly 21a is advanced intermittently with accurate pitch, and, moreover, concentric tracks of true circles are formed with accurate track pitch without wobbling at the time of stoppage of the intermittent advance. Particularly when the magnetic head assembly 21a reaches the outermost peripheral position or the innermost position of the magnetic disc 15, and the pulse motor 12a is reversed in its direction of intermittent rotation in order to reverse the direction of travel of the magnetic head assembly 21a, the magnetic head assembly 21a is fed in the reversed direction with accurate specific pitch without pitch deviation since, as described above, the backlash between the rack 19a and the pinion 17a is in a substantially nonexistent state.

Since, by the use of the mechanism of this invention, the magnetic head assembly can be caused to advance intermittently and reverse its travel direction with very accurate pitch without wobbling at the time of rest, the guard bands (unrecorded bands) between tracks as allowance for track deflection can be made very narrow. For this reason, the number of tracks on the magnetic disc 15 can be increased, and the recording capacity of the disc can be increased.

Here, even when the contact bar 32a is not parallel to the guide bar 22a as viewed in FIG. 4, the position on the contact bar 32a contacted by the pin 30a merely shifts as the feeding carriages 18a and 20a are displaced in the arrow directions C and D, and there is no positional change whatsoever mutually between the feeding carriages 18a and 20a, whereby no undesirable occurrences whatsoever arise. Since the rack feeding carriage 18a and the head feeding carriage 20a are guided by a single guide bar 22a, it is necessary to accurately and positively set only this guide bar 22a. For this reason, the assembly, adjustment, and production of the mechanism are facilitated, and production cost is low. Further, even when the contact bar 32a is not exactly parallel to the guide bar 22a in the height direction in FIGS. 5A and 5B, there is no undesirable result since the head feeding carriage 20a rotates together with the pin 30a.

As the pulse motor 12a alternately repeats rotation and stopping intermittently, and the rack 19a alternately repeats shifting and stopping intermittently, there is a possibility of a hunting phenomenon occurring in the arrow directions C and D at the time of stopping of rotation (i.e., time of stopping of feeding). In order to prevent this hunting, depending on the necessity, grease may be applied to the interior of the cylindrical member 33a thereby to impart viscous resistance to movement between the guide bar 22a and the cylindrical member 33a. The impact vibration in the arrow directions A and B of the rack feeding carriage 18a accompanying the intermittent feeding and stopping of the rack 19a is absorbed by the springs 40a and 41a and is not transmitted to the head feeding carriage 20a. Therefore, generation of jitter is prevented.

The positions of the springs 40a and 41a are not limited to those indicated in the drawing and may be any other as long as these springs impart torques in mutually opposite directions to the rack feeding carriage 18a and the head feeding carriage 20a.

Since the feeding mechanism on the left-hand side of the disc motor 11 as viewed in FIGS. 1 and 2 has the same construction as the above described feeding mechanism on the right-hand side, it will not be described. However, a member 44 forming a projection or convexity is provided at the position on a contact part 32b corresponding to the concavity 43 of the contact bar 32a. When the rack feeding carriage 18b and the head feeding carriage 20b are displaced to the left from their positions indicated in FIG. 1, a pin 30b rides onto the member 44, and the head feeding carriage 20b rotates upward about the guide part 22b. The magnetic head 21b thereby moves upward and separates from the upper surface of the disc 15.

Further, this invention is not limited to these embodiments but various variations and modifications may be made without departing from the scope of the invention.

What is claimed is:

1. A transducer feeding mechanism in an apparatus for recording and reproducing a signal on and from a rotary recording medium by means of a transducer fed over the recording medium in the radial direction thereof, said mechanism comprising:

a rotational motive power source having a rotary shaft and a pinion provided on the shaft;

a rack meshed with said pinion and fed in translational movement by the rotation of the pinion;

a single guide bar extending in the direction of feeding of the transducer;

a first feeding carriage on which the rack is mounted, and which is guided by said guide bar;

a second feeding carriage on which the transducer is mounted, and which is guided by said guide bar;

a contact bar extending in substantially parallel with the guide bar;

a contact member mounted on the second feeding carriage and contacting said contact bar; and biasing means provided between the first and second feeding carriages and functioning to impart torques to the first feeding carriage in a direction to cause the rack to mesh further with the pinion and to the second feeding carriage in a direction to cause the contact member to contact the contact bar.

2. A transducer feeding mechanism as claimed in claim 1 which further comprises a cylindrical member fixed to said first feeding carriage and fitted slidably and rotatably to the guide bar, and ball-bearing means provided between the cylindrical member and second feeding carriage, said first feeding carriage being rotatable unitarily with said cylindrical member about and around the guide bar, said second feeding carriage being rotatable about the guide bar and around the cylindrical member through the ball-bearing means.

3. A transducer feeding mechanism as claimed in claim 1 in which said biasing means comprises at least one spring member provided between parts of the first and second feeding carriage in a compressed state, said spring member imparting torques to the first and second feeding carriages to cause them to rotate in mutually opposite directions.

4. A transducer feeding mechanism as claimed in claim 1 in which said contact bar is provided with a part, at a predetermined position thereof, to rotate the contact member about the guide bar together with the second feeding carriage in a direction in which the transducer separates from the rotary recording medium, while the contact member slides with sliding movement of the first and second feeding carriages along the guide bar.

5. A transducer feeding mechanism as claimed in claim 4 in which the transducer records and reproduces the signal on and from the lower surface of the rotary recording medium; the contact member contacts the upper surface of the contact bar; and the contact bar is provided with a concavity at the predetermined position thereof.

6. A transducer feeding mechanism as claimed in claim 4 in which the transducer records and reproduces the signal on and from the upper surface of the rotary recording medium; the contact member contacts the upper surface of the contact bar; and the contact bar is provided with a convexity at the predetermined position thereof.

* * * * *